US008875613B2

(12) United States Patent
O'Neal

(10) Patent No.: US 8,875,613 B2
(45) Date of Patent: Nov. 4, 2014

(54) REMOVABLE INSPECTION PANEL

(76) Inventor: Kerry O'Neal, Eagle, ID (US)

( * ) Notice: Subject to any disclaimer, the term of this patent is extended or adjusted under 35 U.S.C. 154(b) by 28 days.

(21) Appl. No.: 13/466,683

(22) Filed: May 8, 2012

(65) Prior Publication Data

US 2013/0298484 A1 Nov. 14, 2013

(51) Int. Cl.
*F41H 5/24* (2006.01)
*F41H 5/04* (2006.01)

(52) U.S. Cl.
USPC ................. 89/36.04; 52/1; 273/403; 273/410

(58) Field of Classification Search
USPC ........... 89/36.01, 36.02, 36.04; 273/410, 403, 273/404, 408; 109/58, 70, 81, 85; 52/1
See application file for complete search history.

(56) References Cited

U.S. PATENT DOCUMENTS

| 2006/0234069 A1* | 10/2006 | Sovine et al. ................. 428/457 |
| 2009/0090236 A1* | 4/2009 | Misencik et al. ............ 89/36.02 |
| 2011/0062667 A1* | 3/2011 | Medina et al. ................ 273/404 |

* cited by examiner

*Primary Examiner* — William Gilbert
(74) *Attorney, Agent, or Firm* — Parsons Behle & Latimer

(57) ABSTRACT

A removable inspection panel for use with a projectile containment assembly in a shoot house or on a firing range where the firing of live ammunition is carried out is provided. The inspection panel is removably attached to a supporting structure between the supporting structure and a projectile containment assembly. The inspection panel is removable from the top of the supporting structure, for example, for periodic inspection of the condition of the inspection panel. Any detectable damage to the surface of the inspection panel facing the projectile containment assembly indicates immanent failure of the projectile containment assembly.

19 Claims, 2 Drawing Sheets

REMOVABLE INSPECTION PANEL

BACKGROUND

1. Field of the Disclosure

The present application relates generally to projectile containment assembly safety devices and, more specifically, to a projectile containment assembly or wall assembly which includes a removable inspection panel forming a portion or all of one or more shoot house walls.

2. Description of the Related Art

Certain personnel such as police and members of the armed forces have jobs that require them to carry and use fire arms. For their own and the public's safety, armed personnel must be properly trained. Traditionally, much of this training occurs at firing ranges. However, for these personnel to safely use their firearms, a large portion of training must occur in more realistic settings. To accomplish this, additional training may occur on specifically designed assault courses including structures commonly known as shoot houses. These structures provide for many actual combat situations where trainees must quickly and accurately identify and respond to realistic threats to their safety.

To better simulate actual combat situations, training is generally conducted in groups using live ammunition. Since personnel may need to quickly fire their weapon as they enter a room, it is necessary that the shoot house walls be able to withstand the impact of multiple rounds of ammunition. Shoot house walls must also be constructed to prevent bullets from ricocheting off the wall and injuring trainees. Traditional shoot houses were originally constructed out of concrete, tires, or gravel filled walls. As technology improved, shoot houses have become more sophisticated and better able to stop bullets and ricocheting. However, even with current technology, shoot house walls may fail without warning.

Firing ranges pose many of the same threats to nearby personnel as a shoot house. The ranges must be configured in a manner that will stop bullets and prevent ricocheting bullets from injuring anyone nearby. Projectile containment assemblies are commonly used in both shoot house walls and firing ranges to stop projectiles and prevent ricocheting by slowing down and capturing the projectile.

Projectile containment assemblies are of widely varying configurations, from a single layer of solid concrete or thick steel, to a plurality of layers of various materials. By way of example, a containment assembly used in a known shoot house wall consists of a fixed containment assembly having three layers: a thick concrete anterior and posterior layer with and interior containment assembly layer consisting of a material to absorb and capture any bullets or fragments that may ricochet off the wall.

More recently, modular projectile containment assemblies have been developed which are comprised of modular containment assembly panels having a bullet retaining layer spaced from an impenetrable core layer, secured to a base member. One such example is a projectile containment assembly modular wall assembly having a bullet retaining layer made of ballistic rubber spaced from an impenetrable layer made of steel and secured to a modular base member. Bullets fired at the wall pass through the ballistic rubber, shatter on the steel back of the panel. A device may be placed below the space between the ballistic rubber layer and the steel layer to capture and retain any resulting projectile fragments.

Projectile containment assemblies pose a significant threat to safety in that they may fail without warning if the various containment assembly layers become weakened or worn with prolonged use. Failure of the projectile containment assembly may then allow projectiles or bullets to impact the wall being protected damaging the wall and, ultimately, causing failure of the wall. What is needed an apparatus which will provide early indication or warning of an imminent failure of the projectile containment assembly or wall assembly.

SUMMARY OF THE DISCLOSURE

The present application discloses a removable inspection panel to monitor the soundness of projectile containment assemblies and indicate, for example, when a shoot house wall is no longer safe. In a first embodiment, a removable inspection panel constructed of impact resistant material, steel plate, for example, is removably disposed between a projectile containment assembly and a supporting structure. Spaced vertical spacer elements are attached to and separate the projectile containment assembly from the supporting structure defining a gap therebetween. The panel of impact resistant material is removably disposed between the spaced vertical spacer elements. The removable inspection panel is removable to allow periodic inspection of the inspection panel. In another embodiment, the removable inspection panel is slidably supported between the spaced vertical spacer elements. In yet another embodiment, one or more inspection panels are slidably supported between pairs of the spaced vertical spacer elements.

In another embodiment, an inspection panel assembly includes an inspection panel of an impact resistant material, such as steel plate, for example, is removably mounted to a supporting wall. A backstop panel of abrasion resistant steel plate, for example, is placed in front of the inspection panel. A panel of resilient material, such as styrene butedyne rubber, for example, is placed in front of and spaced from the backstop panel. The panel of resilient material is attached to and covers the backstop panel. In some embodiments, the panel of resilient material is attached to a rigid backing layer to provide support. One or more pairs of spaced vertical spacer elements are placed between the supporting wall and the backstop panel, and the inspection panel is slidably disposed between the pair of vertical spacer elements. A top side of the inspection panel assembly is open to allow removal of the inspection panel for periodic inspection.

BRIEF DESCRIPTION OF THE DRAWINGS

The following figures, in which like numerals indicate elements, form part of the present specification and are included to further demonstrate certain aspects of the present disclosure. The disclosure may be better understood by reference to one or more of these figures in combination with the detailed written description of specific embodiments presented herein.

These and other embodiments of the present application will be discussed more fully in the description. The features, functions, and advantages can be achieved independently in various embodiments of the claimed invention, or may be combined in yet other embodiments.

DETAILED DESCRIPTION

One or more illustrative embodiments are described below. Not all features of an actual implementation are necessarily described or shown for the sake of clarity. The present invention is generally directed to an inspection panel assembly incorporating a removable inspection panel in a projectile containment assembly. One of ordinary skill in the art of projectile containment assemblies will appreciate that the various embodiments of the invention can and may be used in any number of projectile containment assemblies.

Figure 1:
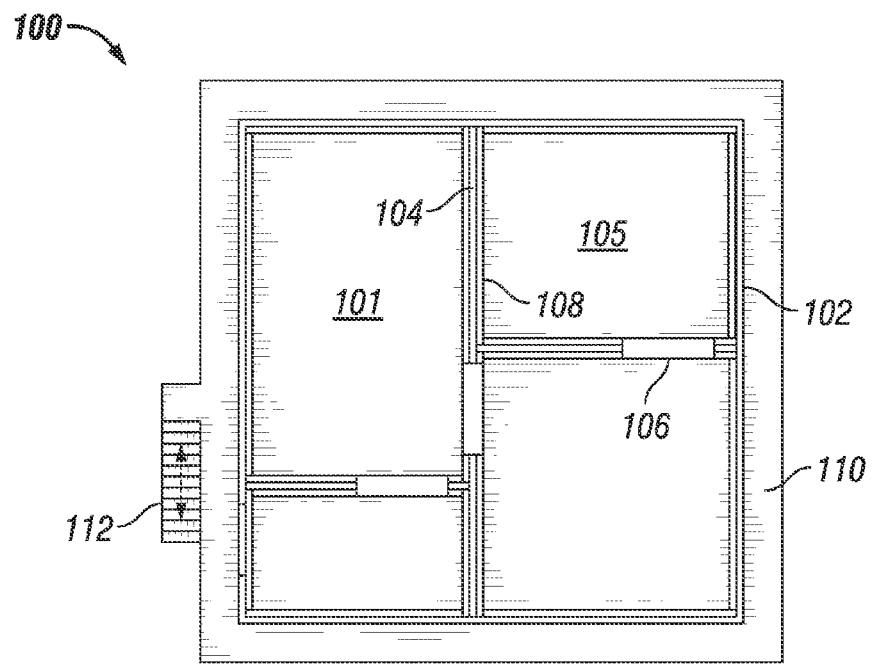
FIG. 1 is a top plan view of an embodiment of a shoot house described in the present application.

Referring now to FIG. 1, a top plan view of a typical shoot house 100 is shown. Military and law enforcement personnel routinely face known or potential combative threats when they enter houses and other buildings in the regular course of their work. Shoot houses, similar to shoot house 100, have been developed to facilitate the training of these personnel by creating scenarios similar to actual combat scenarios. To more closely simulate true combat scenarios, shoot houses are often designed to replicate house and/or building floor plans. Potential friendly and adverse targets (not shown) are concealed within shoot house 100. Training of personnel involves quickly and accurately identifying the actual threat of such targets.

To that end, shoot houses are generally constructed with exterior walls 102 defining a generally rectangular structure 101. The interior of structure 101 may be configured with various features such as interior walls 104 forming passageways and separate rooms 105, doors 106, windows (not shown) and stairwells (not shown), for example. Exterior walls 102 provide the structural strength and integrity of the shoot house and may be constructed of any suitable material, such as steel plate, concrete, concrete block or brick and mortar, for example. Interior walls 104 are permanently attached to and supported by exterior walls 102. Alternately, interior walls 104 may be temporarily attached to exterior walls 102 to allow for reconfiguration of the interior of shoot house 100. Interior walls 104 may be constructed of any suitable material such as steel plate, for example.

Shoot houses are generally constructed outdoors and are protected from the elements of nature by an overhanging roof or covering structure (not shown). Shoot house floor plans are traditionally open and may provide a catwalk 110 around a portion of or all of the upper perimeter of the exterior and interior walls above the shoot house structure 101. The catwalk 110 is accessible via exterior stairway 112. Training facilitators may safely observe training missions from the catwalk 110. The open floor plan also provides access to the shoot house walls 102, 104 for purposes of maintaining and/or replacing portions of the wall or walls.

Generally, the anterior portions of the exterior and interior walls 102, 104 defining each room or hallway 105 incorporate projectile or bullet containment assemblies 108 either integral with or attached to the anterior surface of the walls 102, 104 to accommodate live-fire within the shoot house structure 101. More specifically, the anterior walls in each room or hallway 105 include armored panels and/or armored steel plates to maintain the integrity of the watts when impacted by projectiles or bullets. Bullet containment assemblies 108 are required protect personnel both inside and outside the building from stray and/or ricocheting projectiles or bullets and projectile fragments. Bullet containment assemblies 108 also minimize or prevent dust and fragments resulting from the impact of bullets with the shoot house walls 102, 104 Projectile containment assemblies vary greatly in their design. Often, a lower portion of the bullet containment assemblies 108 are either open to a space below or otherwise contain a system for the collection and disposal of spent projectiles and fragments.

Figure 2:
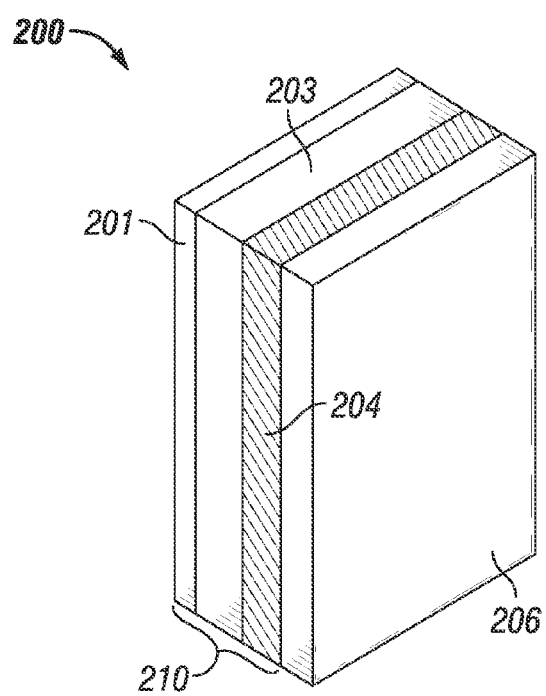
FIG. 2 is a perspective view of a prior art projectile containment assembly supported by a shoot house wall.

Referring now to FIG. 2, a perspective view of a commonly utilized prior art wall and projectile or bullet containment assembly 200 is illustrated. Projectile containment assembly 210 incorporates a plurality of layers or panels including a backstop panel 204 attached to an anterior side of a support structure 206 such as the exterior walls 102 or interior walls 104 (shown in FIG. 1). Backstop panel 204 is of a suitable material, such as abrasion resistant steel plate, for example, for stopping and absorbing the energy of a projectile, such as a bullet, for example, impacting the containment assembly 210. A removable panel 201 of resilient material, such as styrene butedyne rubber or recycled, vulcanized tire rubber (sometimes referred to as ballistic rubber), for example, attached to the front side or anterior side of containment assembly 210 and covers the backstop panel 204. Panel 201 is separated from the surface of backstop panel 204 by a short distance, one inch, for example.

When a projectile or bullet impacts the containment assembly 210, the projectile passes through resilient panel 201 and impacts against and is stopped by the backstop panel 204. The projectile's velocity is reduced substantially by its passage through the resilient panel 201 while the remaining energy is absorbed by the projectile's impact against the backstop panel 204. Projectile or bullet fragments and other debris, such as lead dust, for example, are contained within the air space between the backstop panel 204 and the resilient panel 201. The projectile fragments and other debris drop to the bottom of the containment assembly 210 into a tray (not shown), for example, for collection and disposal. In the event the resilient panel 201 becomes damaged due to bullets or other projectiles repeatably passing through the panel 201, it can be easily replaced. Similarly, backstop panel 204 may be removably mounted to the wall 102, 104 to facilitate removal and replacement in the event it becomes damaged due to repeated impacts of bullets or other projectiles.

Figure 3:
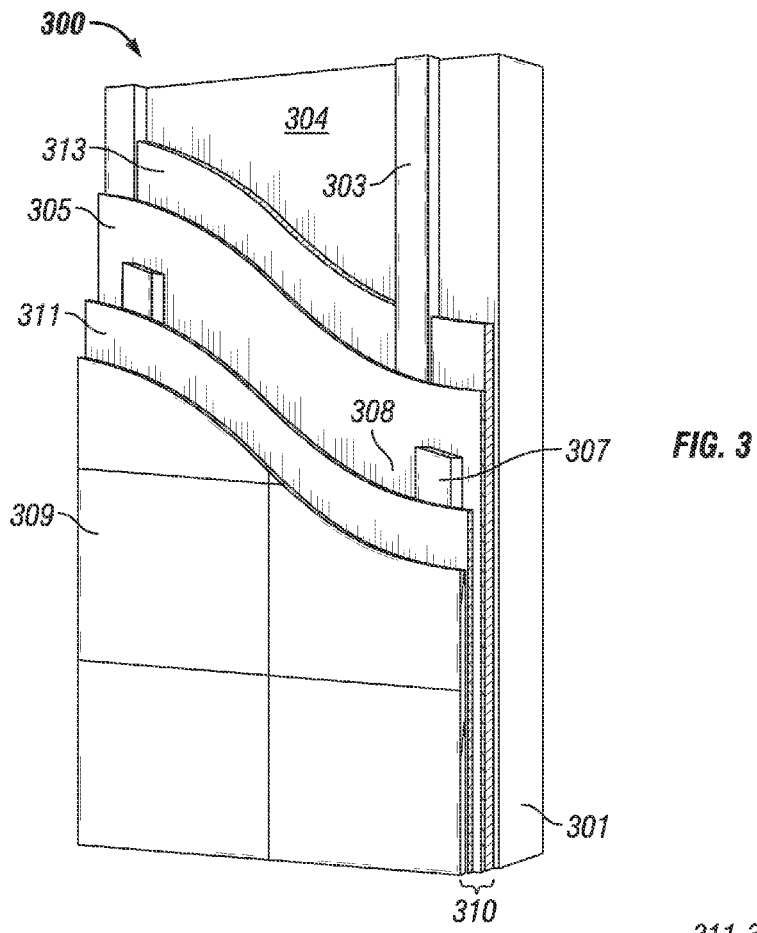
FIG. 3 is a perspective view from the front of an embodiment of an inspection panel assembly supported by a shoot house wall as disclosed in the present application.
Figure 4:
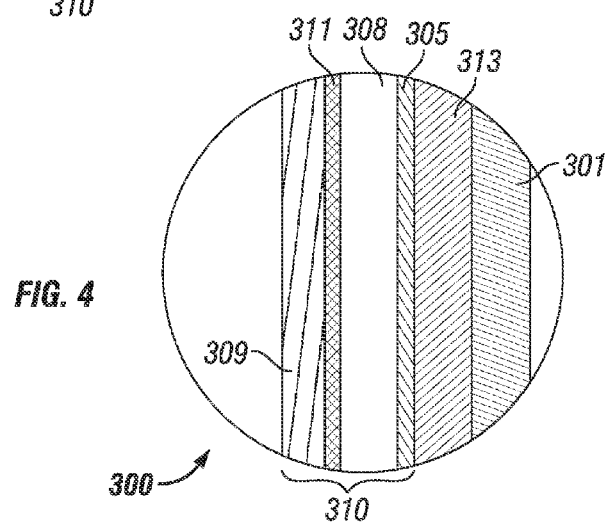
FIG. 4 is a cross-sectional view of the inspection panel assembly supported by a shoot house wall shown in FIG. 3.

Referring now to FIGS. 3 and 4, FIG. 3 illustrates a perspective view from the front of a wall and inspection panel assembly 300 according to an embodiment of the removable inspection panel as disclosed in the present application. FIG. 4 is a cross-sectional view of the wall and inspection panel assembly 300 shown in FIG. 3. A support structure or back panel 301, such as exterior wall 102 or interior wall 104, for example, as shown in FIG. 1, supports a projectile containment assembly 310. Support structure 301 is constructed of a suitable material, such as steel plate, concrete, concrete block or brick and mortar, for example. Projectile containment assembly 310 is spaced from support structure 301 by spacer elements 303 providing a space or gap 304 in which a removably inspection panel 313 is disposed. Vertical spacers 303 of a suitable material, such as two-inch by four-inch wooden studs or beams, for example, are attached at regular intervals across the anterior surface of wall 301. To build the projectile assembly 310, a backstop panel 305 is attached to the spacers 303, the spacers 303 forming gap 304 between the anterior face of the wall 301 and the posterior face of backstop panel 305. The gap 304 between support structure 301 and backstop panel 305 may be about one and one-half inches, for example. The backstop panel 305 is of a suitable material, such AR500 steel plate, for example, for stopping and absorbing the energy of a projectile, such as a bullet, for example, fired at the containment assembly 310. A resilient panel 309 of suitable material, such as styrene butedyne rubber or recycled, vulcanized tire rubber (sometimes referred to as ballistic rubber), for example, is attached to the front side of the containment assembly 310 covering the surface of the anterior face of backstop panel 305 and forms the anterior or front wall of the projectile containment assembly 310. The resilient panel 309 is separated from the backstop panel 305 by spacers 307 forming an airspace 308 therebetween. Spacers 307 are of a suitable material, such as two-inch by four-inch wooden studs or beams, for example. The spacing between the resilient panel 309 and the backstop panel 305 may be about one and one-half inches, for example. The posterior face of resilient panel 309 may be attached to and supported by a rigid backing layer 311 such as one-half-inch plywood, for example.

An inspection panel 313 of a suitable impact resistant material, such as steel plate, for example, is removably attached to and supported between spacers 303 in gap 304 between the backstop panel 305 and the anterior face of the wall 301. For example, the inspection panel 313 may be slideably mounted in tracks formed in facing edges of the spacers 303. In certain embodiments, inspection panel assembly 300 may be open at the top to allow inspection panel 313 to be removed and inspected to determine the soundness of the backstop panel 305. Any detectable damage to the inspection panel 313 indicates that the backstop panel 305 has failed or that failure is imminent. A failed or badly damaged backstop panel 305 can be replaced prior to the wall 301 being damaged or breached by any projectiles or bullets passing through the backstop panel 305. If damaged, the inspection panel 313 may also be removed and replaced with another inspection panel.

In another embodiment according to the present disclosure, the inspection panel assembly may be supported by a backstop or other support structure located at a shooting range.

In another embodiment according to the present disclosure, the inspection panel assembly 300 is modular rather than a single unit allowing the components to be shipped to a site and assembled for use. A modular inspection panel assembly 300 may also be disassembled tier shipment and reassembled at a different site.

Although the present disclosure has been described in terms of certain embodiments, other embodiments that are apparent to those of ordinary skill in the art, including embodiments which do not provide all of the features and advantages set forth herein, are also within the scope of this disclosure. Accordingly, the scope of the present disclosure is defined by the claims that follow.

What is claimed is:

1. A removable inspection panel comprising:
    a panel of impact resistant material removably disposed between a projectile containment assembly and a supporting structure, the panel of impact resistant material abutting against the supporting structure and the panel of impact resistant material may be slidably removed while the projectile containment assembly remains securely connected to the supporting structure, wherein spaced vertical spacer elements are attached to and abut against the supporting structure and separate the projectile containment assembly and the supporting structure defining a gap therebetween, the panel of impact resistant material being removably disposed between the spaced vertical spacer elements.

2. The removable inspection panel of claim 1, wherein the impact resistant material comprises a steel plate.

3. The removable inspection panel of claim 1, wherein the panel of impact resistant material is slidably supported between the spaced vertical spacer elements.

4. The removable inspection panel of claim 3, wherein one or more panels of impact resistant material are slidably supported between pairs of the spaced vertical spacer elements.

5. The removable inspection panel of claim 1, wherein the removable inspection panel is removable to allow periodic inspection of the removable inspection panel.

6. An inspection panel assembly comprising:
    an inspection panel of an impact resistant;
    a backstop panel connected to a supporting wall and being disposed in front of the inspection panel, the inspection panel abutting against the supporting wall and the backstop panel, and being slidably disposed in a space between the backstop panel and the supportg wall, wherein the inspection panel may be removed from the space while the backstop panel is securely connected to the supporting wall; and
    a panel of resilient material covering the backstop panel, the panel of resilient material being spaced from the backstop panel.

7. The inspection panel assembly of claim 6, further comprising at least a pair of spaced vertical spacer elements disposed between the supporting wall and the backstop panel, the inspection panel slidably disposed between the pair of vertical spacer elements.

8. The inspection panel assembly of claim 6, further comprising a rigid backing layer attached directly to a posterior face of and supporting the panel of resilient material.

9. The inspection panel assembly of claim 6, wherein the impact resistant material comprises a steel plate.

10. The inspection panel assembly of claim 6, wherein a top side of the inspection panel assembly is open to allow removal of the inspection panel.

11. The inspection panel assembly of claim 6, wherein the resilient material comprises styrene butadiene rubber.

12. The inspection panel assembly of claim 6, wherein the resilient material comprises vulcanized rubber.

13. A shoot house comprising:
    one or more supporting walls defining an enclosed structure; and
    an inspection panel assembly attached to an anterior surface of at least one of the walls, wherein the inspection panel assembly comprises:
    an inspection panel of an impact resistant material;
    a backstop panel connected to a supporting wall of the one or more supporting walls and being disposed in front of the inspection panel, the inspection panel being slidably disposed in a gap between the backstop panel and the supporting wall, wherein the inspection panel may be removed from the gap while the backstop panel is securely connected to the supporting wall; and
    a panel of resilient material covering the backstop panel, the panel of resilient material being spaced from the backstop panel.

14. The shoot house of claim 13, wherein the impact resistant material comprises a steel plate.

15. The shoot house of claim 13, wherein the inspection panel assembly further comprises at least a pair of spaced vertical spacer elements that abut against the supporting wall and that abut against the backstop panel, the inspection panel slidably disposed between the pair of vertical spacer elements.

16. The shoot house of claim 15, wherein one or more inspection panels are slidably supported between pairs of the spaced vertical spacer elements.

17. The shoot house of claim 13, wherein a top side of the inspection panel assembly is open to allow removal of the inspection panel.

18. The shoot house of claim 13, wherein the inspection panel assembly further comprises a rigid backing layer attached directly to a posterior face of and supporting the panel of resilient material.

19. The shoot house of claim 13, wherein the resilient material comprises styrene butadiene rubber.

\* \* \* \* \*

UNITED STATES PATENT AND TRADEMARK OFFICE
CERTIFICATE OF CORRECTION

| | | |
|---|---|---|
| PATENT NO. | : 8,875,613 B2 | Page 1 of 1 |
| APPLICATION NO. | : 13/466683 | |
| DATED | : November 4, 2014 | |
| INVENTOR(S) | : Kerry O'Neal | |

It is certified that error appears in the above-identified patent and that said Letters Patent is hereby corrected as shown below:

In the Claims

Col. 6, line 7, claim 6 should read

6. An inspection panel assembly comprising: an inspection panel of an impact resistant material;

a backstop panel connected to a supporting wall and being disposed in front of the inspection panel, the inspection panel abutting against the supporting wall and the backstop panel, and being slidably disposed in a space between the backstop panel and the supporting wall, wherein the inspection panel may be removed from the space while the backstop panel is securely connected to the supporting wall;

and a panel of resilient material covering the backstop panel, the panel of resilient material being spaced from the backstop panel.

Signed and Sealed this
Twenty-sixth Day of May, 2015

Michelle K. Lee
*Director of the United States Patent and Trademark Office*